(12) United States Patent
Morioka

(10) Patent No.: US 10,225,198 B2
(45) Date of Patent: Mar. 5, 2019

(54) BANDWIDTH CONTROL CIRCUIT, ARITHMETIC PROCESSING APPARATUS, AND BANDWIDTH CONTROL METHOD FOR APPARATUS

(71) Applicant: FUJITSU LIMITED, Kawasaki-shi, Kanagawa (JP)

(72) Inventor: Kiyonori Morioka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 253 days.

(21) Appl. No.: 15/240,250

(22) Filed: Aug. 18, 2016

(65) Prior Publication Data
US 2017/0063701 A1    Mar. 2, 2017

(30) Foreign Application Priority Data

Aug. 24, 2015    (JP) ................................. 2015-164494

(51) Int. Cl.
| | | |
|---|---|---|
| *G06F 15/173* | (2006.01) | |
| *H04L 12/825* | (2013.01) | |
| *H04L 12/26* | (2006.01) | |
| *H04L 12/801* | (2013.01) | |

(52) U.S. Cl.
CPC .......... *H04L 47/25* (2013.01); *H04L 43/0894* (2013.01); *H04L 43/16* (2013.01); *H04L 47/11* (2013.01)

(58) Field of Classification Search
CPC ......... H04L 47/25; H04L 47/11; H04L 43/16; H04L 43/0894
See application file for complete search history.

(56) References Cited

U.S. PATENT DOCUMENTS

| | | | | |
|---|---|---|---|---|
| 6,028,841 | A * | 2/2000 | Lyon | ....................... H04L 47/22 370/232 |
| 9,832,282 | B2 * | 11/2017 | Hong | ................... H04L 47/2475 |
| 2004/0225759 | A1 | 11/2004 | Kohashi | |
| 2005/0083973 | A1 * | 4/2005 | Krishnan | ................. H04L 47/11 370/468 |
| 2007/0025250 | A1 * | 2/2007 | Shimonishi | ............. H04L 69/16 370/231 |
| 2008/0002676 | A1 * | 1/2008 | Wiley | ..................... H04L 47/12 370/356 |
| 2008/0209093 | A1 * | 8/2008 | Huang | ................... G06F 13/362 710/107 |
| 2008/0244135 | A1 | 10/2008 | Akesson et al. | |

FOREIGN PATENT DOCUMENTS

| | | | |
|---|---|---|---|
| JP | 2004-326180 | A | 11/2004 |
| JP | 2006-350573 | A | 12/2006 |
| JP | 2008-541217 | A | 11/2008 |
| JP | 2012-199788 | A | 10/2012 |

\* cited by examiner

*Primary Examiner* — Richard G Keehn
(74) *Attorney, Agent, or Firm* — Fujitsu Patent Center

(57) ABSTRACT

A bandwidth control circuit includes bandwidth control units and a management unit to control each of the bandwidth control units. Each bandwidth control unit includes: a bandwidth monitor unit to monitor a bus usage bandwidth of each of the plurality of the circuit blocks; an operating period observation unit to monitor a start and an end of an operating period of each of the plurality of the circuit blocks; and a limit unit to be enabled to limit the bus usage bandwidth of each of the plurality of the circuit blocks. The management unit limits the bus usage bandwidth, corresponding to a bus average usage bandwidth and the operating period of each of the plurality of the circuit blocks.

7 Claims, 9 Drawing Sheets

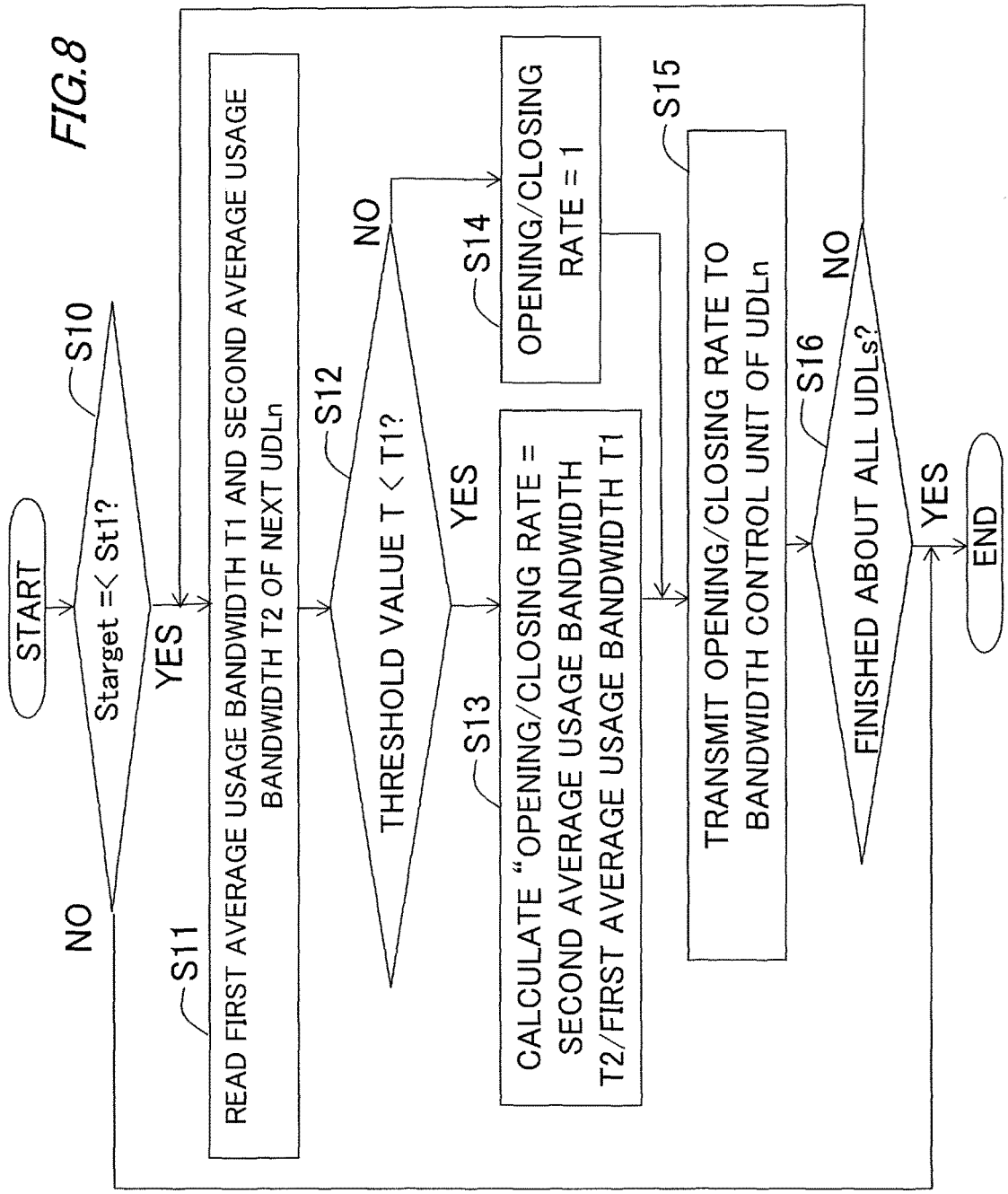

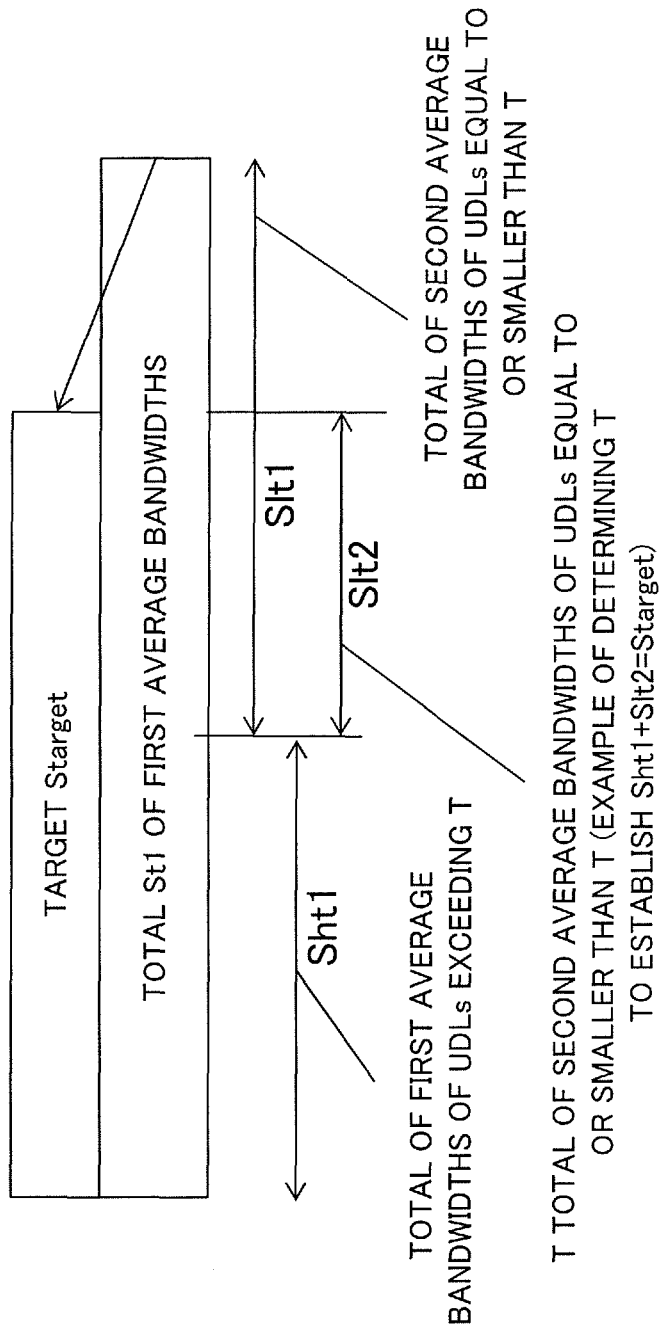

BANDWIDTH CONTROL CIRCUIT, ARITHMETIC PROCESSING APPARATUS, AND BANDWIDTH CONTROL METHOD FOR APPARATUS

CROSS-REFERENCE TO RELATED APPLICATIONS

This application is based upon and claims the benefit of priority of the prior Japanese Patent Application No. JP2015-164494, filed on Aug. 24, 2015, the entire contents of which are incorporated herein by reference.

FIELD

The present invention pertains to a bandwidth control circuit, an arithmetic processing apparatus, and a bandwidth control method for the apparatus.

BACKGROUND

Over the recent years, Central Processing Units (CPUs) of computers have encountered a slowdown of improving performance through micronization. Consequently, it is examined that the high performance of the computer is attained by using circuit blocks of an Field Programmable Gate Array (FPGA) and other equivalent programmable logic devices as an accelerator of the CPU.

FIG. 1 illustrates a configuration of a computer 810 including the FPGA. The computer 810 is also called an information processing apparatus. The computer 810 in FIG. 1 includes a CPU 801, a memory 802 and an FPGA 805. The CPU 801 and the FPGA 805 are interconnected via an expansion bus 804A. The FPGA 805 includes a control unit/bus bridge 852, and communicates with the CPU 801 via the expansion bus 804A. The FPGA 805 includes a plurality of User Defined Logics (UDLs) 851. Each UDL 851 communicates with the CPU 801 and the memory 802 via the control unit/bus bridge 852 and the expansion bus 804A.

The CPU 801 provides a plurality of Virtual Machines (VMs) 812. The VMs 812 are also called virtual computers. The virtual computer provides a user with a virtual CPU as a resource. The CPU 801 of the computer 810 providing these virtual machines is also called a physical CPU. The memory 802 is also called a physical memory. The CPU 801 includes a cache 811 in an example of FIG. 1.

The recent computers have a spread of virtual computer technologies, in which a larger number of virtual CPUs than a number of physical CPUs are usable in the example of FIG. 1. In other words, the users use virtual computing resources via a network on the virtual computers, without having physical computing resources. The users can increase or decrease the computing resources according to necessity without purchasing the physical computing resources instanced by the physical CPUs and the physical memories, while the virtual computers provide cloud services. On the other hand, a device, e.g., the FPGA including the circuit block serving as the accelerator of the physical CPU or the virtual CPU comes to be installed with a partially rewritable function of the circuit while operating the circuit.

By the way, when the accelerators frequently using the bus operate simultaneously, a bus conflict occurs and affects performance of a whole system as the case may be. Particularly when the respective accelerators are universally designed, such a problem arises as to consume bus bandwidths equal to or larger than the bandwidths satisfying a request of a requester (user) of the accelerators. Such being the case, the prior arts involve performing proper arbitration or allocation of the bandwidths on the premise that properties of the accelerators are previously known to some extent in order to assure overall bandwidths that are smoothly processible by the system on the assumption of using fixed circuits and fixed applications.

However, when the computer uses the plurality of the circuit blocks of the FPGA and other equivalent programmable logic devices, the arbitration or the allocation of the bandwidths of the bus for connecting the CPU, the memory and other equivalent components to the respective circuit blocks are not adequately conducted as the case may be. For example, as in nowadays, pluralities of applications, threads and virtual machines (users) share the plurality of the accelerators for use, in which case the arbitration or the allocation of the bandwidths might not be adequately carried out. Further, e.g., when processing time of a certain specified accelerator becomes a bottleneck in a certain application, such a circumstance might occur that a priority is desired to be given to this accelerator to the greatest possible degree. However, the processing time of this specified accelerator does not necessarily become the bottleneck to other applications. Accordingly, such a state might occur that bandwidth limitation is set in the specified accelerator in other applications, but it is desirable to give the priority to, rather, other applications. In other words, it might happen that focusing on the specified application is not optimal to the computer system on the whole.

DOCUMENTS OF PRIOR ARTS

Patent Documents

[Patent Document 1] Japanese Unexamined Patent Publication No. 2008-541217
[Patent Document 2] Japanese Patent Application Laid-Open Publication No. 2006-350573
[Patent Document 3] Japanese Patent Application Laid-Open Publication No. 2012-199788
[Patent Document 4] Japanese Patent Application Laid-Open Publication No. 2004-326180

SUMMARY

According to one aspect, the present invention can be exemplified by a bandwidth control circuit. The bandwidth control circuit includes bandwidth control units to be provided respectively for a plurality of circuit blocks cooperating with a processor via a bus and a management unit configured to control each of the bandwidth control units. Each bandwidth control unit includes a bandwidth monitor unit configured to monitor a bus usage bandwidth of each of the plurality of the circuit blocks, an operating period observation unit configured to monitor a start and an end of an operating period of each of the plurality of the circuit blocks, and a limit unit configured to be enabled to limit the bus usage bandwidth of each of the plurality of the circuit blocks.

The management unit limits the bus usage bandwidth, corresponding to each bus average usage bandwidth and each operating period of the plurality of the circuit blocks.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 8 is a flowchart illustrating a bandwidth limit processing flow;

FIG. 9 is a diagram illustrating effects yielded by processes in the embodiment.

DESCRIPTION OF EMBODIMENT(S)

An information processing apparatus including a bandwidth control circuit according to one embodiment will hereinafter be described with reference to the drawings. A configuration of the following embodiment is an exemplification, and the present information processing apparatus is not limited to the configuration of the embodiment. The embodiment will exemplify the information processing apparatus including a plurality of accelerators cooperating with a processor via a bus, and the processor. For example, an assumption is that the accelerators involve using a plurality of circuit blocks provided as an FPGA. The plurality of circuit blocks provided as the FPGA is called a plurality of User Defined Logics (UDLs). The FPGA used as the accelerator according to the embodiment includes bandwidth limit circuits to respectively control bandwidths for the plurality of UDLs.

Figure 1:
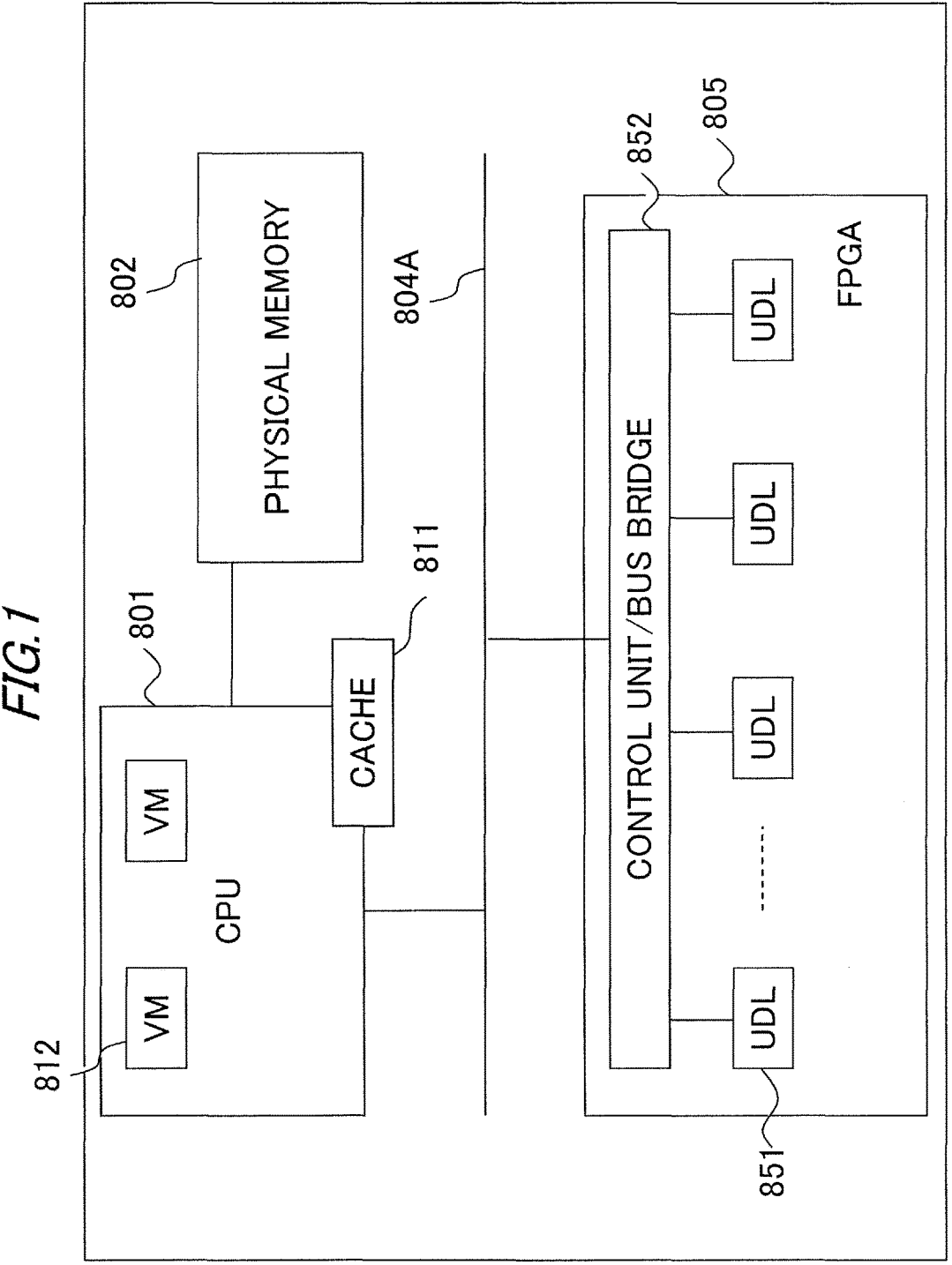
FIG. 1 is a diagram illustrating a configuration of a computer including an FPGA.

FIG. 1 illustrates a configuration of an information processing apparatus 810 according to a comparative example. The embodiment assumes a case that users are provided with a plurality of Virtual Machines (VMs) instanced by virtual computers on the information processing apparatus, and the plurality of users uses the FPGA by properly mapping a configuration of the FPGA to processes of the respective virtual machines. It is also assumed that the circuit blocks of the FPGA mapped to the processes of the virtual machines are designed to enhance performances to the greatest possible degree similarly to a software library without depending on request performances of applications making use of the FPGA.

On the other hand, some accelerators focus on computing but have a small amount of bus usage, i.e., a small quantity of bandwidth in use, while some accelerators use a large amount of bus usage, resulting in intermingling of the accelerators in type. As the case may be, however, it is difficult to predetermine arbitration of shared resources instanced by the bus between the circuits operating simultaneously when the circuits are dynamically laid out. This being the case, the information processing apparatus observes an operating period of the operation including a way of being used by the application while observing the bus bandwidth used by the FPGA, and thus estimates an operating ratio (also termed an availability ratio) defined as a ratio of the operating period to a predetermined period. The information processing apparatus provides a method of attaining effective allocation of the bandwidth of the bus as one of the shared resources to the individual UDLs within the FPGA on the basis of the observed operating period or the estimated operating ratio. Note that the bus bandwidth used by the FPGA can be exemplified by a bandwidth of a memory bus leading to a memory from the FPGA. A technique according to the embodiment is not, however, limited to the memory bus but can be applied to a bus leading to, e.g., a CPU from the FPGA.

<Configuration>

Figure 2:
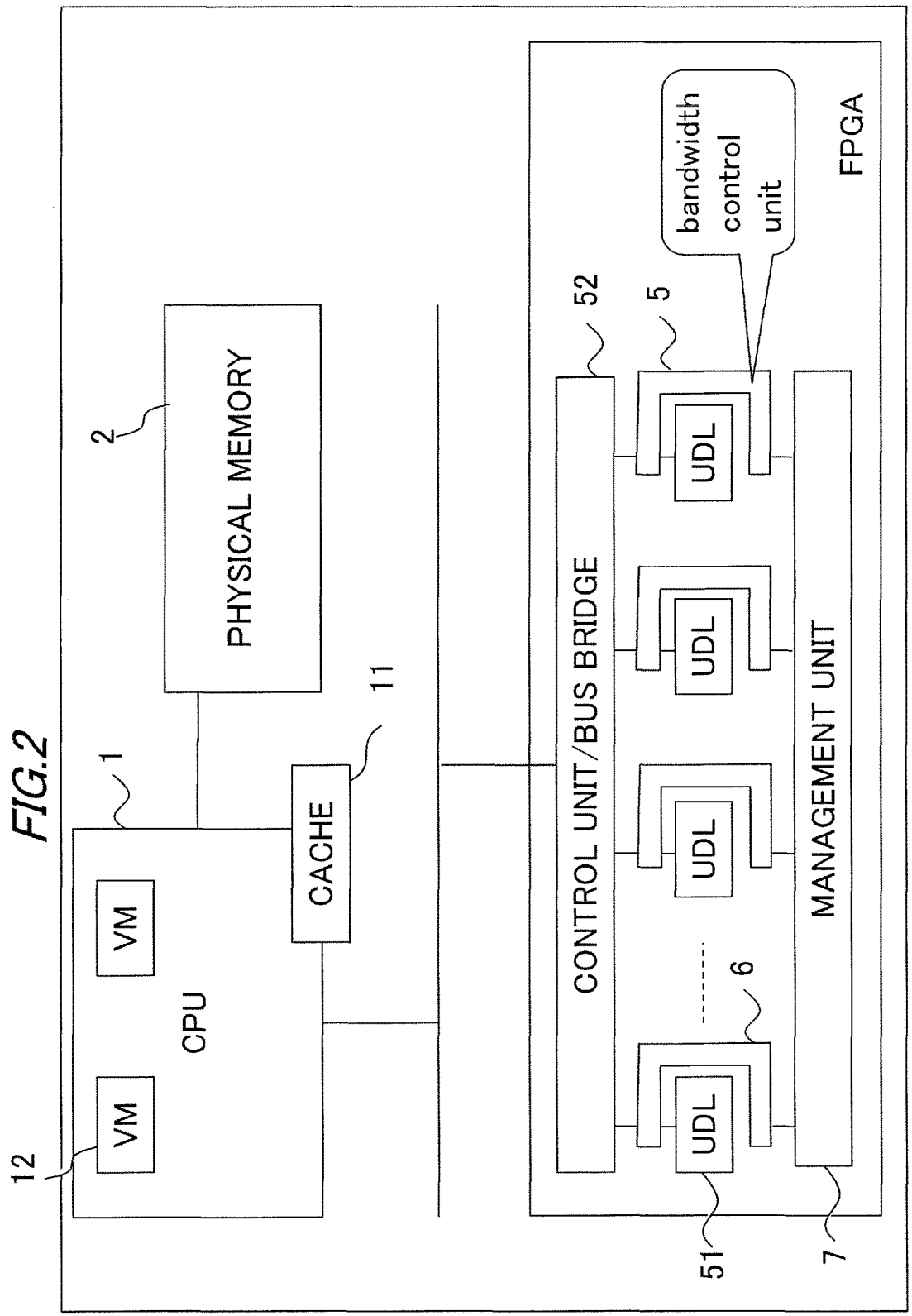
FIG. 2 is a diagram illustrating a configuration of an information processing apparatus in an embodiment.

FIG. 2 illustrates a configuration of an information processing apparatus 10 according to the embodiment. The information processing apparatus 10 includes a CPU 1, a memory 2 and an FPGA 5. Note that the information processing apparatus 10 may include, though omitted in FIG. 2, peripheral devices instanced by an external storage device and a Network Interface Card (NIC). The CPU 1 includes a cache 11, and accesses the memory 2 via the cache 11. The user is provided with a plurality of Virtual Machines (VMs) 12 on the CPU 1. Applications used by the user are allocated with the VMs 12 and are made to run on the VMs 12. The CPU may, however, execute programs by way of processes, threads and other equivalent program units without via the VMs 12. The CPU 1 is one example of a "processor". The CPU 1 and the FPGA 5 are one example of an "arithmetic processing apparatus". The information processing apparatus 10 may, however, be one example of the "arithmetic processing apparatus".

The FPGA 5 includes a control unit/bus bridge 52, a UDLs 51, a bandwidth control unit 6 and a management unit 7. Each of the components of the FPGA 5 is a hardware circuit built up by combining digital circuits instanced by a gate circuit and a memory. Each of the components of the FPGA 5 may, however, include a processor and a memory that stores a program.

The control unit/bus bridge 52 transfers and receives information via the bus between the circuit within the FPGA 5 and the CPU 1 or the memory 2. It does not mean that a configuration of the control unit/bus bridge 52 is limited in the embodiment. The control unit/bus bridge 52 may be connected to the CPU 1 or the memory 2 via, e.g., an address line, a data line and a control line. The control unit/bus bridge 52 may also be connected to the CPU 1 or the memory 2 via a serial bus for transferring and receiving packets, in which case the control unit/bus bridge 52 is also called a router.

The UDLs 51 are, e.g., a combination of the digital circuits reconfigurable on the FPGA 5. The UDLs 51 reconfigure the circuits, thereby providing processes as the accelerators for the variety of application programs. When the UDLs 51 of the FPGA 5 thus provide the variety of processes requested for the applications, it may be said that the UDLs 51 are allocated or mapped to these processes. The UDL 51 is one example of a "circuit block".

A circuit scale of the UDL 51 varies corresponding to a function to be provided. The UDLs 51 are exemplified by a sum-of-product arithmetic circuit for signal processing, a filter circuit for image processing, a data encryption circuit or a data decryption circuit, and a computer graphic processing circuit. The UDLs 51 can be classified corresponding to processes to be executed into the logics executing mainly the arithmetic process, the logics transferring and receiving data to and from the memory 2 and other equivalent devices via the bus, and the logics executing both of the arithmetic process and the data transferring/receiving process at a substantially equal rate.

The bandwidth control unit 6 is provided by being paired with each UDL 51. The bandwidth control unit 6 observes a signal for starting up the process of the UDL 51 from the CPU 1, a signal for terminating the process, and a signal for inputting and outputting the data between the UDL 51 and the bus, and reports an observation result to the management unit 7. The bandwidth control unit 6 limits a bus usage bandwidth of the paired UDL 51 in response to an instruction given from the management unit 7.

The management unit 7 having received the observation results from the respective bandwidth control units 6, checks the bus usage bandwidths of the overall UDLs 51 within the FPGA 5, and effectively allocates the bus usage bandwidth to each of the UDLs 51, based on an operation status and the bus usage bandwidth of each of the UDLs 51, a total of the bus usage bandwidths of the overall UDLs 51 within the FPGA 5 and other equivalent values.

In other words, the bandwidth control unit 6 and the management unit 7 cooperate to determine the allocation of the bus usage bandwidths among the UDLs 51 or determine the limit of the usage bandwidths. The bandwidth control unit 6 and the management unit 7, even when a combination of the UDLs 51 mapped to the variety of processes and being in operation varies dynamically, appropriately determine the allocation of the bus usage bandwidths to the UDLs 51 or determine the limit of the usage bandwidths. In other words, the bandwidth control unit 6 and the management unit 7 grasp the operation statuses of the UDLs 51 for a predetermined monitoring period inclusive of time other than when operating in addition to the usage bandwidths of the individual UDLs 51 in operation. The bandwidth control unit 6 and the management unit 7 indirectly grasp the operation statuses of the overall UDLs 51 within the FPGA 5 by observing the individual UDLs. The management unit 7 determines, based on the observation results of the operation statuses, the UDLs 51 as the bus bandwidth control targets, and controls the bandwidths corresponding to the operation statuses of the determined UDLs 51.

To be more specific, the bandwidth control unit 6 observes the startup signal and the termination signal given to the UDLs 51 from the CPU 1, thus grasping an operating period of each UDL 51. The bandwidth control unit 6 observes the bus usage bandwidth of the UDL 51 for one length of operating period ranging from starting up the UDL 51 to terminating the UDL 51. The bandwidth control unit 6 measures a circuit operating ratio per predetermined monitoring period longer than one length of operating period, i.e., a ratio of the operating period to the predetermined monitoring period irrespective of the operating period of the UDL 51. Note that the bandwidth control unit 6 may also measure a ratio of a non-operating ratio (idle period) in place of the operating ratio. The measured operating ratio (non-operating ratio) is used as an estimated value of the operating ratio indicating a characteristic unique to the UDL 51. The bandwidth control unit 6 observes an average bus usage bandwidth of the UDL 51 for the predetermined monitoring period.

The management unit 7 checks the total of the bus usage bandwidths of the overall UDLs 51 of the FPGA 5 at startup timing of the UDL 51, at predetermined timing or at a predetermined cycle. When the total of the bus usage bandwidths is deficient, the management unit 7 determines the UDL 51 to be limited in bandwidth among the UDLs 51 within the FPGA 5, and limits the bandwidth thereof. More specifically, the management unit 7 measures of the total of the bus usage bandwidths of the UDLs 51 in operation, and determines whether the measured total of the bus usage bandwidths is equal to or larger than a predetermined reference value (Starget). However, the management unit 7 may also determine "whether in excess of the reference value (Starget)" in place of determining "whether equal to or larger than the reference value (Starget)".

The management unit 7 dynamically determines a threshold value for determining whether the bus usage bandwidth is high or low. When the total of the bus usage bandwidths is deficient, the management unit 7 limits the bandwidth of the UDL 51 with the operating ratio being relatively low among the UDLs 51 with the bus usage bandwidths exceeding the threshold value.

For example, the UDL 51 having the relatively low operating ratio among the UDLs 51 with the bus usage bandwidths being equal to or larger than the threshold value, is determined to perform an intermittent operation and is limited in bandwidth more strictly. In other words, the UDL 51 performing the intermittent operation consumes a large portion of the bandwidth for a short period containing a time point at present; and, however, the consumption of the bandwidth can be determined relatively low when viewed from a certain length of long period. Even when limiting the bandwidth of the UDL 51 performing the intermittent operation, an influence by limiting the bandwidth is therefore considered to be small when viewed from the long period to some degree.

On the other hand, the UDL 51 having the relatively high operating ratio among the UDLs 51 with the bus usage bandwidths being equal to or larger than the threshold value, is determined to perform a critical task. The bus usage bandwidth is allocated preferentially to the UDL 51 performing the critical task. The UDL 51 with the bus usage bandwidth being smaller than the threshold value is determined to perform a task dominated mainly by the computing. The bus usage bandwidth is allocated preferentially to the UDL 51 dominated by the computing.

Figure 3:
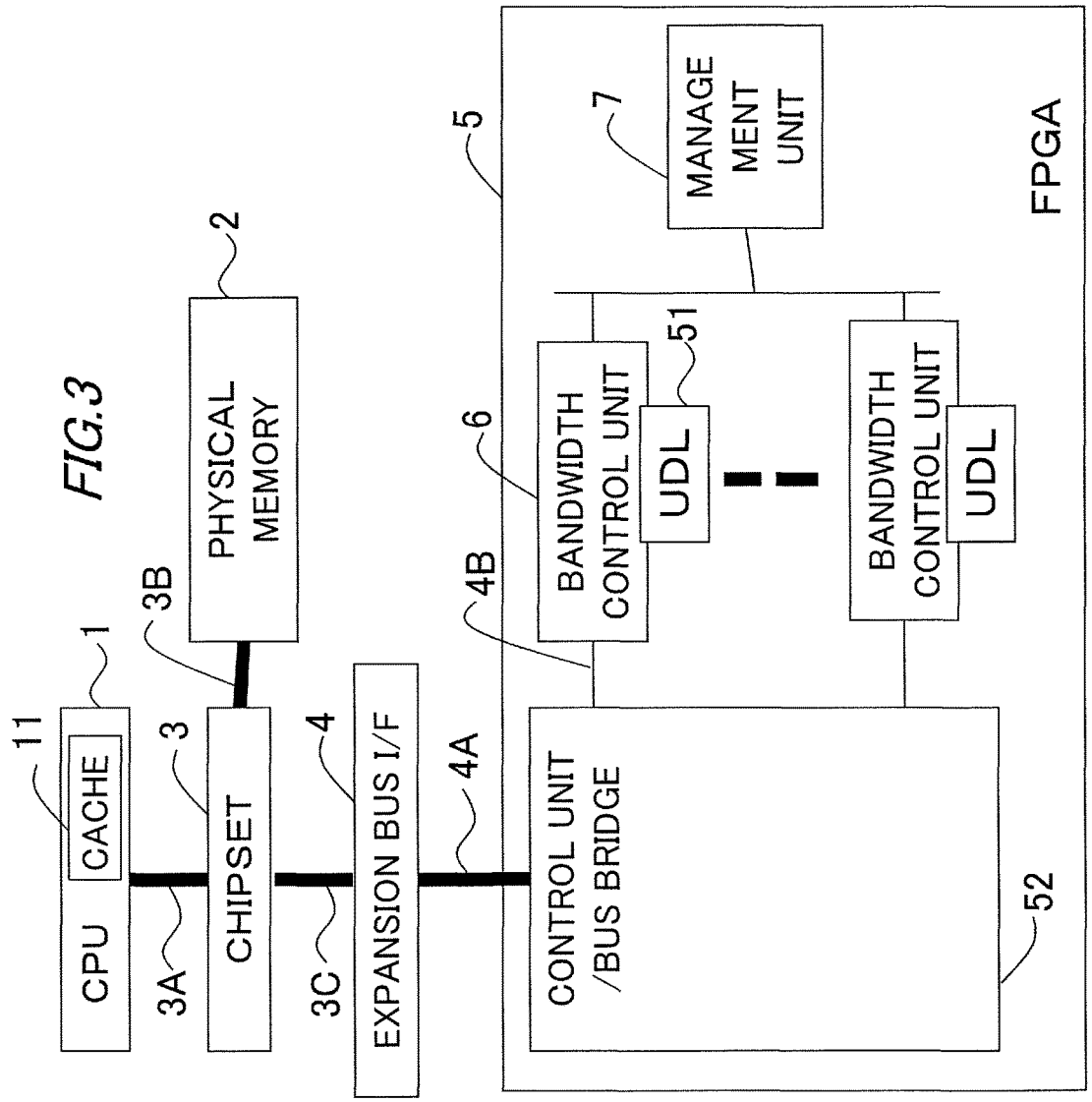
FIG. 3 is a diagram illustrating a bus topology in the information processing apparatus.

FIG. 3 illustrates a bus topology in the information processing apparatus. As in FIG. 3, the CPU 1, the memory 2 and the FPGA 5 are connected to a chipset 3 via the bus connecting with the chipset 3. To be specific, the chipset 3 is connected to the CPU 1 via an internal bus 3A and connected to the memory 2 via a memory bus 3B. The chipset 3 is further connected to an expansion bus interface 4 via an external bus 3C. The expansion bus interface 4 is connected to the control unit/bus bridge 52 of the FPGA 5 via an expansion bus 4A. The control unit/bus bridge 52 is connected to the bandwidth control unit 6 via a transmission path 4B within the FPGA. Each bandwidth control unit 6 is connected to the management unit 7.

Accordingly, when the UDL 51 transfers and receives the information to and from the memory 2 or the CPU 1, a problem is caused by the allocation of the bandwidth on the bus having the narrowest bandwidth among the transmission path 4B, the expansion bus 4A, the external bus 3C, the memory bus 3B and the internal bus 3A each serving as the path for transferring and receiving the information. In the embodiment, the bandwidth control unit 6 observes a start and an end of the operating period of the UDL 51 when the UDL 51 transfers and receives the data via the transmission path 4B and the usage bandwidth, thus limiting the usage bandwidth of the UDL 51 on the transmission path 4B. The usage bandwidth on the transmission path 4B is limited, thereby limiting the usage bandwidths on the transmission path 4B, the expansion bus 4A, the external bus 3C, the memory bus 3B and the internal bus 3A each serving as the path. The transmission path 4B, the expansion bus 4A, the external bus 3C, the memory bus 3B and the internal bus 3A are each one examples of a "bus".

Figure 4:
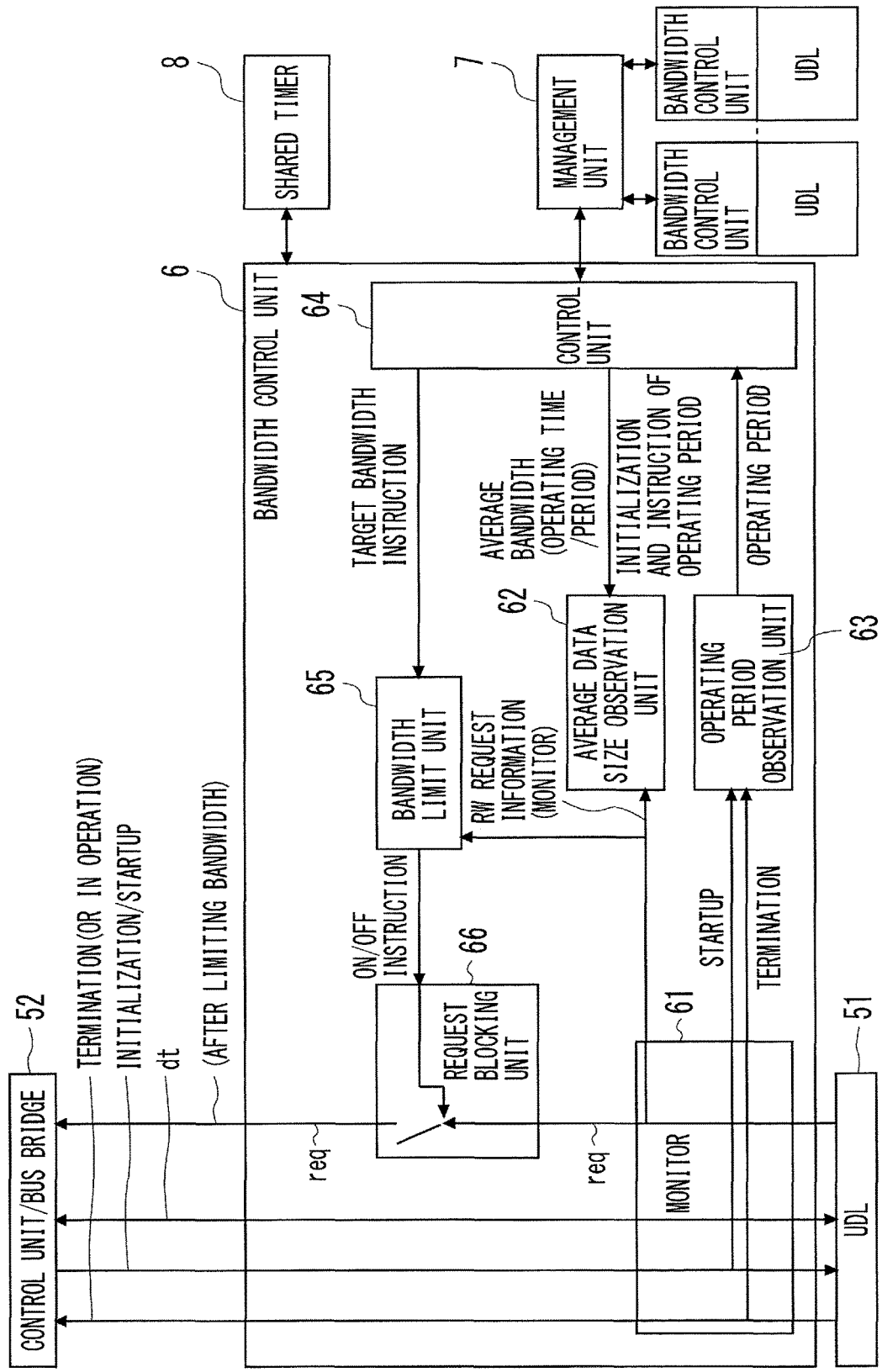
FIG. 4 is a diagram illustrating a detailed configuration of a bandwidth control unit.

FIG. 4 illustrates a detailed configuration of the bandwidth control unit 6. FIG. 4, however, depicts the UDLs 51, the control unit/bus bridge 52, the management unit 7 and a shared timer 8 together with the bandwidth control unit 6. As in FIG. 4, the bandwidth control unit 6 includes a monitor 61, an average data size observation unit 62, an operating period observation unit 63, a control unit 64, a bandwidth limit unit 65, and a request blocking unit 66. As already stated, each of the components of the FPGA 5 is the hardware circuit built up by combining the digital circuits instanced by the gate circuit and the memory. The bandwidth control unit 6 and the management unit 7 are therefore the hardware circuits built up by combining the digital circuits instanced by the gate circuit and the memory. However, the bandwidth control unit 6 or the management unit 7 may include the processor and the memory that stores the program.

The monitor 61 monitors the signals between the UDL 51 and the control unit/bus bridge 52. For example, the monitor 61 branches a signal line between the UDL 51 and the control unit/bus bridge 52 to thereby transmit the signals to the average data size observation unit 62 and the operating period observation unit 63. It may be therefore sufficient that the monitor 61 has a signal branch circuit. For instance, the signals to be monitored by the monitor 61 may be of a serial bus packet and may also be of the signal lines including a data line, an address line, a control line and other equivalent lines.

The control unit/bus bridge 52 transmits an instruction signal for initializing or starting up the process to the UDL 51. The instruction signal for initializing or starting up the process is a signal for conveying an instruction for the application (or the virtual machine) on the CPU 1 to start up or initialize the UDL 51. On the other hand, the UDL 51 transmits a signal indicating a process end status or an operation active status and a request signal to the control unit/bus bridge 52. The signal indicating the operation end status or the operation active status is a signal for conveying that the UDL 51 has finished the process or is active in operation. The request signal is a request signal for reading from, e.g., the memory 2 or writing to the memory 2. The request signal contains, e.g., a read or write instruction, a read or write address of the memory 2, and a read or write data size. The operating period observation unit 63 specifies the start and the end of the operating period of the UDL 51 on the basis of an initialization or startup instruction signal and an end or startup indicating signal that are transmitted from the monitor 61, and transfers the specified start and end of the operating period to the control unit 64. The operating period observation unit 63 is one example of an "operating period observation unit" to monitor a start and an end of an operating period of each of a plurality of circuit blocks. The control unit 64 transfers the start and the end of the operating period of the UDL 51 to the average data size observation unit 62.

The average data size observation unit 62 measures an average usage bandwidth for a period during which the UDL 51 is active in operation (which will hereinafter be termed the operating period) and an average usage bandwidth for a predetermined monitor period irrespective of the operating period of the UDL 51, and transfers the measured bandwidths to the control unit 64. The average data size observation unit 62 is one example of a "bandwidth monitoring unit" to monitor a bus usage bandwidth of each of a plurality of circuit blocks. The control unit 64 transfers the two average usage bandwidths measured by the average data size observation unit 62 to the management unit 7. The average data size observation unit 62 obtains, e.g., the request signal transmitted to the memory 2 from the UDL 51. It may be, however, sufficient that the average data size observation unit 62 obtains a request packet transmitted to the memory 2 from the UDL 51 via the serial bus. The average data size observation unit 62 obtains a read or write data size contained in the request signal, and integrates the data sizes. The average data size observation unit 62 calculates, from the integrated data size, the two average usage bandwidths each defined as a data size per unit time. Note that the read or write data is inputted and outputted with a fixed length, the average data size observation unit 62 may simply count a transmission count of the request signal and integrate the data sizes.

When a total of the average usage bandwidths, which is obtained by integrating the bandwidths of the UDLs 51, exceeds the predetermined reference value (Starget), the management unit 7 determines the UDL 51 to be limited in bandwidth on the basis of the information on the operating periods of the UDLs 51 and the two average usage bandwidths of the UDLs 51. The management unit 7 notifies a target bandwidth limit value to the control unit 64 of the bandwidth control unit 6 of the UDL 51 to be limited in bandwidth.

The control unit 64 receiving the notification indicates the notified target bandwidth limit value to the bandwidth limit unit 65. The control unit 64 can be said to be an interface circuit between the management unit 7 and each component of the bandwidth control unit 6.

The bandwidth limit unit 65 performs ON- or OFF-control of a switch of the request blocking unit 66, based on the indicated target bandwidth limit value. The request blocking unit 66 includes a switch to block or connect a request signal given to the control unit/bus bridge 52 from the UDL 51. The request blocking unit 66 connects (ON) or disconnects (OFF) the switch in accordance with the instruction given form the bandwidth limit unit 65. Note that the ON- or OFF-instruction of the switch, which is given to the request blocking unit 66 from the bandwidth limit unit 65, in the embodiment is made in a range not causing timeout when a timeout error disabling the UDL 51 from continuing the operation while waiting to receive a response to the request signal in the UDL 51. In other words, according to the embodiment, the switch-OFF period is set in the range not causing the timeout error in the UDL 51. The bandwidth limit unit 65 and the request blocking unit 66 are one example of a "limit unit" to enable a bus usage bandwidth to be limited with respect to each of the plurality of circuit blocks.

The shared timer 8 measures the time and notifies the bandwidth control unit 6 of the measured time. For example, the average data size observation unit 62 of the bandwidth control unit 6 causes the shared timer 8 to measure the time, and calculates the average usage bandwidth within a predetermined monitor period.

Figure 5:
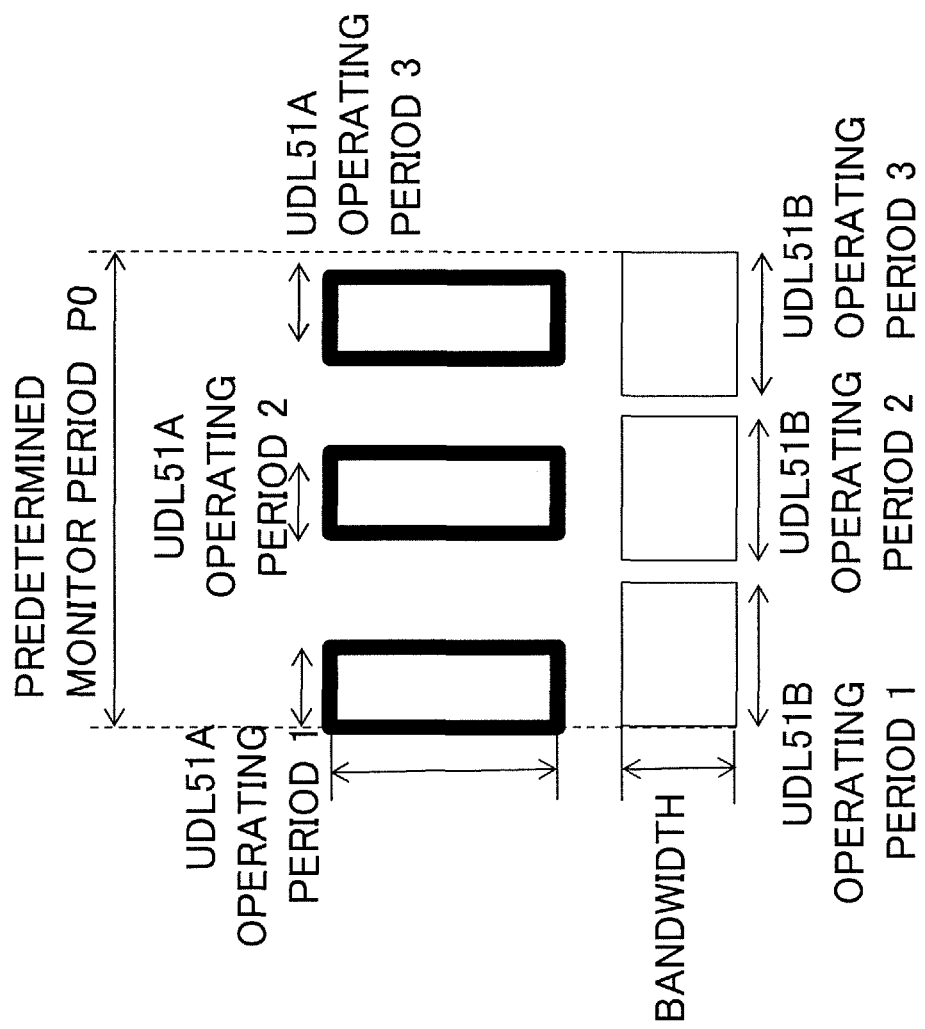
FIG. 5 is a diagram illustrating a relationship between operating periods of UDLs and a predetermined monitor period.

FIG. 5 represents a relationship between the operating period of the UDL 51 and the predetermined monitor period. FIG. 5 illustrates the operating periods and the usage bandwidths of the two UDLs 51 (UDL 51A and UDL 51B). In FIG. 5, the axis of abscissa indicates the time (period), while the axis of ordinate indicate the bandwidth. In FIG. 5, with respect to both of the UDL 51A and the UDL 51B, a predetermined monitor period PO encompasses three lengths of operating periods. The operating period of the UDL 51A is, however, shorter than the operating period of the UDL 51B. On the other hand, the average usage bandwidth of the UDL 51A during the operating period is larger than the average usage bandwidth of the UDL 51B during the operating period. As in FIG. 5, the usage bandwidth of the UDL 51A being shorter in operating period but larger in average usage bandwidth and the usage bandwidth of the UDL 51B being longer in operating period but smaller in average usage bandwidth, are evaluated by two types of calculation methods given below.

The first average usage bandwidth connotes an average usage bandwidth obtained by dividing a data size inputted and outputted to the bus during the operating period of the UDL 51 by a length (time) of the operating period. The first average usage bandwidth is one example of an "in-operation bus average usage bandwidth". The second average usage bandwidth connotes an average usage bandwidth obtained by dividing a data size inputted and outputted to the bus during the predetermined monitor period by a length (time) of the predetermined monitor period. The second average usage bandwidth can be therefore said to be the average usage bandwidth determined irrespective of the operating period of the UDL 51. The second average usage bandwidth is one example of a "bus average usage bandwidth . . . during the predetermined monitor period not limited to the operating periods of the circuit blocks.

Based on the configurations described above, the FPGA 5 has the following configurations.

A. The FPGA 5 includes the plurality of circuit blocks (UDLs) mapped to the processes of the applications running on one or more CPUs 1, and the CPUs 1 mutually cooperate to execute the signal processing.

B. The FPGA 5 include the operating period observation unit 63 that observes the operation statuses, i.e., the startup and the termination, of the UDL 51 and measures the operating ratio of the UDL 51 for the predetermined period (a Fixed Period). The operating ratio is calculated by a formula instanced by {(Fixed Period-UDL Suspending Time)/Fixed Period}, and other equivalent formulae.

C. The FPGA 5 includes the average data size observation unit 62. The average data size observation unit 62 measures from the request signal, a time average (first average usage bandwidth) of the data size to be inputted and outputted during the operating period of the UDL 51 when the bandwidth control over an access to the memory 2 and other equivalent storages is not applied. The average data size observation unit 62 also observes a time average (the second average usage bandwidth) of the data size inputted and outputted during the predetermined monitor period, which is measured irrespective of the operating period of the UDL 51.

D. The FPGA 5 includes the bandwidth limit unit 65 that limits the bandwidth to a predetermined average data size.

E. The FPGA 5 includes the request blocking unit 66 having the switch that blocks a new request of the bus, based on an ON- or OFF-signal given from the bandwidth limit unit 65.

F. The management unit 7, e.g., when newly starting up the UDL 51, determines to control the bandwidth of any one of the UDLs 51 from the operation statuses of the UDLs 51 at the time of observing the UDLs 51 in operation in such a case that a total of the usage bandwidths of the UDL 51 to be newly started up and the UDLs 51 already in operation exceeds a predetermined threshold value. The usage bandwidth of the UDL 51 to be newly started up is, however, set as an arbitrary initial value (e . . . , 0). The management unit 7 determines, through calculations iterated a predetermined number of times, whether the total of the usage bandwidths exceeds the predetermined threshold value.

G. The processes in A through F are executed when newly starting up the UDL 51 suspended so far for the fixed period. The processes in A through F may also, however, be executed at predetermined timing or at a predetermined cycle.

<Using Mode>

The bandwidth control unit 6 and the management unit 7 in the embodiment are applied to the FPGA 5. The CPU 1 applies one or the plurality of UDLs 51 to the processes of the applications running on the CPU 1. The FPGA 5 has, e.g., a function to rewrite a partial circuit configuration that is called a partial reconfiguration function, in which case the bandwidth control unit 6 and the management unit 7 in the embodiment exhibit effects.

Further, the CPU 1 provides the virtual machines, and the applications running on the virtual machines occupy one or the plurality of UDLs 51, in which case the bandwidth control unit 6 and the management unit 7 in the embodiment exhibit the effects.

Note that when a plurality of virtual machines or a plurality of processes shares the plurality of UDLs with each other, accesses thereto are serialized by a device driver of the CPU 1, the control unit/bus bridge 52 and the interface with the UDL 51, and hence the bandwidth control unit 6 and the management unit 7 according to the embodiment become applicable. In the embodiment, the bus average usage bandwidth is measured on a UDL 51 basis during the operating period of the UDL 51. Accordingly, in the processes exemplified in the embodiment, the bandwidth control unit 6 and the management unit 7 may not distinguish between the process derived from the startup by one virtual machine (or process) and the process shared by the plurality of virtual machines (or processes).

<Processing Flow>

Figure 6:
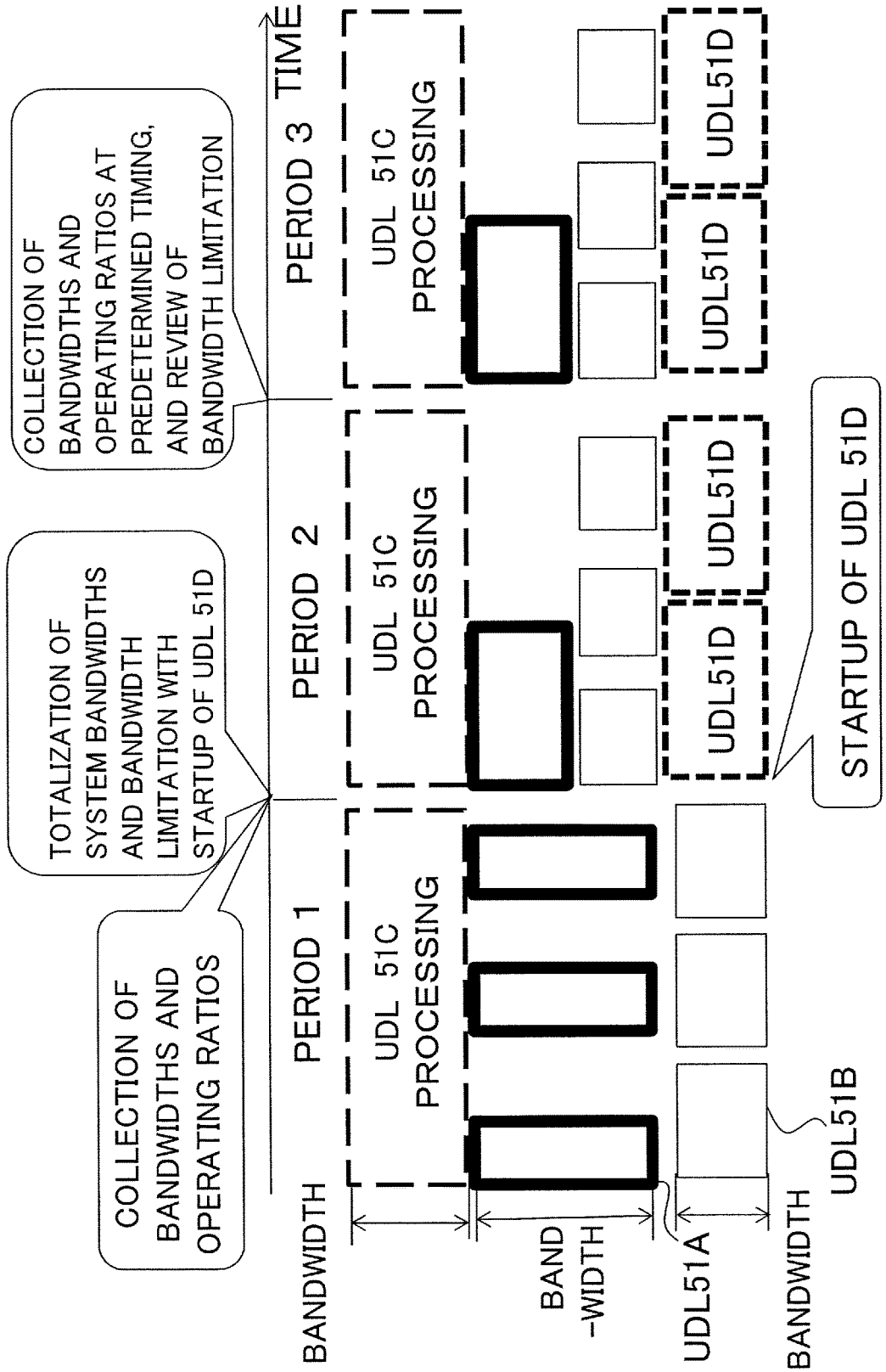
FIG. 6 is a diagram illustrating processes of controlling usage bandwidths of the UDLs.

FIG. 6 illustrates a process to limit the usage bandwidth of the UDL 51. In FIG. 6, the axis of abscissa indicates the time, while a length in a vertical direction represents the usage bandwidth of the bus used by each UDL 51. Three UDLs 51 (UDL 51A, UDL 51B, UDL 51C) are started up in an interval 1 in FIG. 6. In the interval 1, the UDL 51A is shorter in operating period but larger in usage bandwidth than other UDLs 51. A UDL 51D is started up at the beginning of an interval 2 in FIG. 6. An assumption in FIG. 6 is that the usage bandwidth of the overall UDLs 51 ranging from UDL 51A to the UDL 51D exceeds the predetermined limit value (Starget) upon the UDL 51D being started up because of the large usage bandwidth of the UDL 51A during the operating period. This being the case, in FIG. 6, the usage bandwidth of the UDL 51D is ensured by limiting the usage bandwidth of the UDL 51A with its operating ratio being lower than other UDLs 51.

The management unit 7 executes the following processes when starting up the UDL 51 (the UDL 51D in FIG. 6) suspended so far for a fixed period, e.g., for the predetermined monitor period or longer. Note that the management unit 7 may also execute the following processes periodically. The management unit 7 totalizes the first average usage bandwidths of the UDLs 51 in operation, and determines whether a total St1 of the first average usage bandwidths of the overall UDLs 51 in operation is higher than the threshold value Starget (alternatively equal to or larger than the threshold value Starget). The management unit 7, when determining that the total St1 is higher than the threshold value Starget (alternatively equal to or larger than the threshold value Starget; the same expression will be applied to the following discussion), selects the UDLs 51 with the first average usage bandwidths being equal to or larger than a threshold value T (alternatively higher than the threshold value T; the same expression will be applied to the following discussion) from within the UDLs 51, and limits the band widths thereof. Qualitatively, the following priority levels are allocated.

The management unit 7 deems that the UDLs 51 with the operating ratios being low in the UDLs 51 with their first average usage bandwidths being equal to or larger than the threshold value T, perform the intermittent operations, and sets those UDLs 51 as one or a plurality of candidates to which the bandwidth limitation is applied. On the other hand, the management unit 7 give priority to the UDLs 51, as a critical task to the greatest possible degree, even with their first average usage bandwidths being equal to or larger than the threshold value T but with the operating ratios being high. The management unit 7 determines the UDLs 51 with their first average usage bandwidths being smaller than the threshold value T as the UDLs 51 having the small bandwidths or focusing on the computing. In other words, the UDLs 51 with their first average usage bandwidths being smaller than the threshold value T are low in consumed bandwidth and are therefore directly given the priority.

The threshold value T is herein determined by the first average usage bandwidth, the second average usage bandwidth and the operating period of each UDL 51. The management unit 7 selects, based on the threshold value T, the UDLs 51 becoming the bandwidth limit candidates, and preferentially controls the bandwidths of the selected candidates, thereby implementing the control so that the overall UDLs 51 within the FPGA 5 satisfy the target bandwidths.

The following is a determination flow of the threshold value T.

(Step 1) When a certain threshold value T is given, the management unit 7 classifies the UDLs 51, based on the threshold value T. To be specific, the management unit 7 classifies the UDLs 51 into a first group with the first average usage bandwidths being equal to or larger than the threshold value T and a second group with the first average usage bandwidths being smaller than the threshold value T.

(Step 2) The management unit 7 calculates a total Sht1 of the first average usage bandwidths and a total Sht2 of the second average usage bandwidths of the UDLs 51 (the first group) with the first average usage bandwidths being equal to or larger than the threshold value T. The management unit 7 further calculates a total Slt1 of the first average usage bandwidths and a total Slt2 of the second average usage bandwidths of the UDLs 51 (the second group) with the first average usage bandwidths being smaller than the threshold value T. The following formulae 1 and 2 are therefore established, where St1 stands for the total of the first average usage bandwidths of the UDLs 51 in operation, and St2 represents a total of the second average usage bandwidths of the UDLs 51 during the predetermined monitor period inclusive of non-operation time.

$$St1 = Sht1 + Slt1; \quad \text{(Formula 1)}$$

$$St2 = Sht2 + Slt2; \quad \text{(Formula 2)}$$

(Step 3) The management unit 7 calculates "Sht1+Slt2", and determines the threshold value T so that a calculated result of "Sht1+Slt2" becomes equal to or smaller than the target bandwidth Starget. More specifically, the management unit 7 varies the threshold value T and repeats Steps 1-3, thereby obtaining such a threshold value T that the result of "Sht1+Slt2" becomes equal to or smaller than the target bandwidth Starget. For example, the management unit 7 determines the threshold value T by a technique instanced by a binary search so that Sht1+Slt2≤Starget. However, respective terms of "Sht1+Slt2" are weighted by "Alpha" and "Beta", and the management unit 7 may also determine the threshold value T so that Alpha·Sht1+Beta·Slt2≤Starget. Herein, "Alpha" and "Beta" are arbitrary positive numbers less than "1". "Alpha" and "Beta" may also be set to "1".

Figure 7:
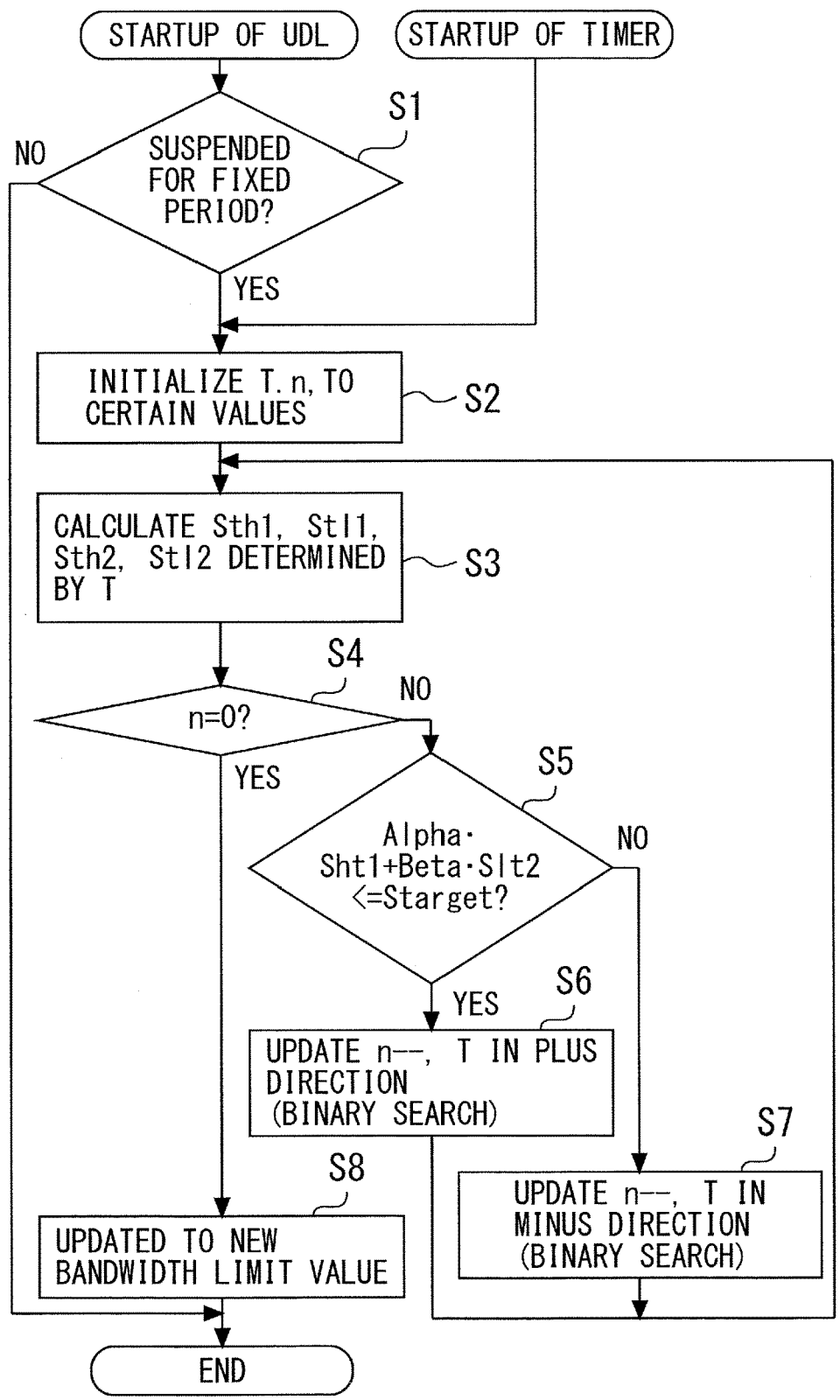
FIG. 7 is a flowchart illustrating a threshold value determination processing flow executed by a management unit.

FIG. 7 illustrates a processing flow for the management unit 7 to determine the threshold value T. This process is started up after the UDL 51 has been suspended for a fixed period (YES in S1) or started at the predetermined timing or at the predetermined cycle set by the shared timer 8. Upon starting up the process, the management unit 7 initializes the threshold value T and a repetition count n (S2). For example, the CPU 1 may simply store a parameter for the initialization in a register within the FPGA 5.

Next, the management unit 7 calculates the total Sht1 of the first usage bandwidths of the first group determined based on the threshold value T, the total Slt1 of the first usage bandwidths of the second group, the total Sht2 of the second usage bandwidths of the first group, and the total Slt2 of the second usage bandwidths of the second group (S3).

The management unit 7 determines whether the repetition count n reaches 0 (S4). When the repetition count n does not reach 0, the management unit 7 determines whether a relationship "Alpha·Sht1+Beta·Slt2≤Starget" is established (S5).

The management unit 7. When a "YES" determination is made in S5, updates the threshold value T in a plus direction and counts down the repetition count n by 1 (S6). The threshold value T may be updated by, e.g., the binary search in a range from a current value of the threshold value T up to a maximum value. The threshold value T may also be updated by adding an increment of the fixed value. For instance, the CPU 1 may set the range and the increment of the threshold value T in the register of the FPGA 5. Then, the management unit 7 loops back to the process in S3.

Whereas when a "NO" determination is made in S5, updates the threshold value T in a minus direction and counts down the repetition count n by 1 (S7). The threshold value T may be updated by, e.g., the binary search in the range from the current value of the threshold value T down to a minimum value. The threshold value T may also be updated by subtracting the increment of the fixed value. Then, the management unit 7 loops back to the process in S3.

When determining in S3 that the repetition count n reaches 0, the management unit 7 updates the calculated bandwidth limit value (the threshold value T) with a new bandwidth limit value (a new calculated threshold value T) (S8). Then, the management unit 7 finishes the processing flow for determining the threshold value T. The execution of the processes in S2-S8 by the management unit 7 is one example of "determining the threshold value so that a total of the in-operation bus average usage bandwidths of the plurality of the circuit blocks of the first group during the operating periods of the circuit blocks and a total of the bus average usage bandwidths of the circuit blocks of the second group during a predetermined monitor period not confined to the operating periods of the circuit blocks, satisfy a predetermined condition".

Described next is a bandwidth limit process based on the threshold value T determined by the processes in FIG. 7. The management unit 7 limits the bandwidth of the UDL 51, corresponding to the operating ratio, in the UDLs 51 with the average usage bandwidths being equal to or larger than the determined threshold value T. Directly, the control is conducted in a way that obtains a value for restraining the first average usage bandwidth from the values of the first and second average usage bandwidths. However, a threshold value for minimum bandwidth guarantee may also be separately provided.

Processing Example 1

The management unit 7 sets a blocking rate of the request blocking unit 66 to an "Opening/Closing Rate=(second average usage bandwidth)/(first average usage bandwidth) per UDL 51, and indicates this rate to the bandwidth control unit 6. As a result, eventually it follows that the bandwidth of each UDL 51 is limited to the second average usage bandwidth. A value given by "Opening/Closing Rate=(second average usage bandwidth)/(first average usage bandwidth) becomes smaller as the operating ratio is lower. This is because as the operating ratio diminishes, an in-operation rate decreases and a non-operating period in the predetermined monitor period PO increases as in the case of the UDL 51A in FIG. 6; and the second average usage bandwidth takes a smaller value than the first average usage bandwidth. It therefore follows that stricter limitation of the bandwidth is applied to the UDL 51 exhibiting a lower operating ratio in the processing example 1.

FIG. 8 illustrates a flow of the bandwidth limit process in the processing example 1. The management unit 7 executes processes in FIG. 8 with respect to all the UDLs 51 within the FPGA 5. Now, the UDL 51 to be processed next is assumed to be a UDL 51n (n=1, 2, . . . ). The management unit 7 at first determines whether a total St1 of a first average usage bandwidth T1 (an average usage bandwidth during the operating period) is equal to or larger than a reference value Starget (S10). When the total St1 is smaller than the reference value Starget, the management unit 7 finishes processing. Whereas when the total St1 is equal to or larger than the reference value Starget, the management unit 7 reads the first average usage bandwidth T1 and a second average usage bandwidth T2 of the UDL 51n from a predetermined storage location (the memory 2 and other equivalent storages) (S11). Subsequently, the management unit 7 determines whether the first average usage bandwidth T1 of the UDL 51n is equal to or larger than the threshold value T (S12). When the first average usage bandwidth T1 of the UDL 51n is equal to or larger than the threshold value T, the management unit 7 sets the opening/closing rate of the request blocking unit 66 is set to a value given by "second average usage bandwidth/first average usage bandwidth" (S13). While on the other hand, when the first average usage bandwidth T1 of the UDL 51n is smaller than the threshold value T, the management unit 7 sets the opening/closing rate of the request blocking unit 66 to "1" (100%) (S14). The management unit 7 transmits the opening/closing rate to the bandwidth control unit 6 of the UDL 51n (S15). Herein, the opening/closing rate is one example of a "Limit Rate". The management unit 7 determines whether the processing for all the UDLs 51n (n=1, 2, . . . ) is finished (S16). When some UDLs 51n remain unprocessed, the management unit 7 loops back to the process in S11. Whereas when the processing for all the UDLs 51n is finished, the management unit 7 terminates the processing. Note that in the processes of FIG. 8, the initial value of the average usage bandwidth of the UDL 51 newly started up is set to 0, in which case there is some likelihood that a "NO" determination is made in S10, and the processing comes to an end. The processes in FIG. 8 are, however, started upon newly starting up the UDL 51 next or periodically started by the shared timer 8. At the next timing, the UDL 51 newly started up this time, of which an actual value of the average usage bandwidth is already measured, can be included as the bandwidth limit target.

Processing Example 2

The bandwidth of the UDL 51 with the first average usage bandwidth being equal to or larger than the threshold value T is uniformly limited by a common opening/closing rate (for example, Coefficient=Slt2/Slt1). In consequence, it follows that the bus usage bandwidth of the UDL 51 with the first average usage bandwidth being equal to or larger than the threshold value T is uniformly limited. In this instance, the opening/closing rate results in being set such as "Coefficient=Slt2/Slt1" in S13.

The management unit 7 executing the processes in FIGS. 7 and 8 is one example of "a management unit limiting a bus usage bandwidth, corresponding to each bus average usage bandwidth and each operating period of a plurality of circuit blocks". The execution of the processes in S11 through S15 by the management unit 7 when the "YES" determination is made in S10 is one example of "limiting the bus usage bandwidths of the plurality of circuit blocks when a total of in-operation bus average usage bandwidths of the operating periods of in-operation circuit blocks in the plurality of circuit blocks exceeds a predetermined reference value". The execution of the processes in S13 and S15 by the management unit 7 when the "YES" determination is made in S12 is one example of "limiting the bus usage bandwidth of the circuit block with the in-operation bus average usage bandwidth exceeding the threshold value in the plurality of the circuit blocks on the basis of a rate of the operating period . . . during the operating period of each of the plurality of circuit blocks". The processes in S12 and S13 are one example of "limiting the usage bandwidth of the circuit block with the in-operation bus average usage bandwidth exceeding the threshold value at a Limit Rate calculated by Limit Rate=bus average usage bandwidth during predetermined monitor period/in-operation bus average usage bandwidth."

<Effects of Embodiment>

FIG. 9 illustrates effects yielded by the processes according to the embodiment. Now, such a case is assumed that the total St1 of the first average usage bandwidths exceeds the predetermined reference value Starget. At least, the threshold value T is set by the processes in FIG. 7 so that a grand total of Sht1+Slt2, i.e., the ground total of the total Sht1 of the first average usage bandwidths of the first group (h group) with the first average usage bandwidth being equal to or larger than the threshold value T and the total Slt2 of the second average usage bandwidths of the second group (l group) with the first average usage bandwidth being smaller than the threshold value T, becomes equal to or smaller than the predetermined reference value Starget. The first average the opening/closing rate is forcibly set for the UDLs 51 with the first average usage bandwidth T1 being equal to or larger than the threshold value T as in the processing examples 1 and 2. The first average usage bandwidth is therefore restrained with an elapse of time in any processing examples.

In the processing example 1, the first average usage bandwidth approximates the second average usage bandwidth of each UDL 51. In this case, the UDL 51 with the lower operating ratio has the lower ratio of the second average usage bandwidth to the first average usage bandwidth, and hence the opening/closing rate is set small, resulting in the strict limit of the bandwidth. In the processing example 2, the opening/closing rate is uniformly set based on "Coefficient=Slt2/Slt1". In this case, the bandwidths of the UDLs 51 with the first average usage bandwidth T1 being equal to or larger than the threshold value T can be uniformly forcibly limited with the same opening/closing rate.

In both of the processing examples 1 and 2, the bandwidths of the UDLs 51 with the first average usage bandwidth T1 being equal to or larger than the threshold value T are limited, and the bus usage bandwidth is controlled in such a direction that the first average usage bandwidth T1 becomes smaller than the threshold value T. As a result, the total of the first average usage bandwidths of all the UDLs 51 approximates the reference value Starget with the elapse of time.

As discussed above, the bandwidth control unit 6 and the management unit 7, which are defined as the bandwidth control circuit according to the embodiment, limit the bus usage bandwidths of the plurality of UDLs 51, corresponding to the bus average usage bandwidths and the operating periods of the plurality of UDLs 51 within the FPGA 5. The bandwidth control unit 6 and the management unit 7 are therefore enabled to control the bandwidths of the UDLs 51 in a way that reflects the operation statuses of the UDLs 51.

When the grand total of the bus average usage bandwidths (the in-operation bus average usage bandwidths) of the UDLs 51 during the operating periods exceeds the predetermined reference value (Starget) (YES in S10 of FIG. 8), the management unit 7 according to the embodiment controls the bandwidths, and consequently the processes can be executed by being confined to a desirable case of the bandwidth limitation.

The management unit 7 according to the embodiment controls the bandwidth of the UDL 51 with the bus average usage bandwidth T1 exceeding the threshold value T during the operating period in the plurality of UDLs 51 (YES in S12 of FIG. 8), and therefore the bandwidth of the UDL 51 considered desirable in bandwidth limitation can be limited.

The management unit 7 according to the embodiment classifies the plurality of UDLs 51 into the first group with the bus average usage bandwidth T1 equal to or larger than the threshold value T during the operating period, and the second group with the average usage bandwidth T1 being smaller than the threshold value T. The management unit 7 determines the threshold value T so that the grand total of Sht1+Slt2, i.e., the ground total of the total Sht1 of the average usage bandwidths of the first group during the operating period and the total Slt2 of the average usage bandwidths of the second group during the predetermined monitor period, becomes equal to or smaller than the reference value Starget. A desirable value as the threshold value T can be set corresponding to a target value of the total of the average usage bandwidths.

The management unit 7 in the embodiment classifies the plurality of UDLs 51 into the first group with the bus average usage bandwidth T1 being equal to or larger than the threshold value T during the operating period, and the second group with the bus average usage bandwidth T1 being smaller than the threshold value T. The management unit 7 repetitively determines the threshold value T so that the grand total of Sht1+Slt2, i.e., the ground total of the total Sht1 of the average usage bandwidths of the first group during the operating period and the total Slt2 of the average usage bandwidths of the second group during the predetermined monitor period, becomes equal to or smaller than the reference value Starget. The bandwidths of the plurality of UDLs can be therefore controlled while reflecting the operation statuses of the plurality of UDLs.

The management unit 7 in the embodiment limits the bandwidth at the rate given by "Average Usage Bandwidth (Second Average Usage Bandwidth)/Average Usage Bandwidth" during the operating period of the UDL 51 when "Opening/Closing Rate=Predetermined Monitor Period" as in S13 with respect to each of the UDLs 51 with the bus average usage bandwidth T1 exceeding the threshold value T (YES in S12 of FIG. 8). The bandwidth can be therefore limited so that the bus average usage bandwidth during the operating period of the UDL approximates the bus average usage bandwidth during the predetermined monitor period. The usage bandwidth of the UDL 51 is limited at the rate of "Average Usage Bandwidth During the Predetermined Monitor Period/Average Usage Bandwidth During Operating Period of UDL 51", and hence the stricter limitation of the usage bandwidth can be applied to the UDL exhibiting the lower operating ratio.

Modified Example

The first average usage bandwidth is used for the comparative calculation with the second average usage bandwidth as the actual value. It is therefore desirable that the first average usage bandwidth is also the actual value. At an initial stage of the processing, however, the user may give a fixed value as a parameter to the management unit 7 by way of the first average usage bandwidth. To be specific, when the UDL 51 is started up for the first time, the value of the first average usage bandwidth is not established. Then, the user may be enabled to set an arbitrary value as the initial value of the first average usage bandwidth. For example, the management unit 7 may gradually make the value approximate to a measured value, in which the initial value is set to 0 in the first calculation. The initial value may be a value estimated when designed. Further, the initial value may involve using a maximum (or minimum) value of the first average usage bandwidths of other UDLs 51 kept operating when executing the processes in FIGS. 7 and 8. Information used when the application had run on the CPU 1 in the past is recorded on an external storage device and other equivalent storages, and the CPU 1 reads values at past operating time of the external storage device when running the application next time and may set the read values in the FPGA 5.

The management unit 7 acquires, as the operating time, a value of the period ranging from the startup to the termination in a state of not applying the bandwidth limitation from the FPGA 5. The management unit 7 may gently control the measured value of the operating period by multiplying a difference between an old value and a new value by a coefficient and adding this calculated value to the old value whenever started up. The management unit 7 may not update the operating period of each UDL 51 every time. The management unit 7 may also update the operating period by acquiring a value of the period from the startup to the termination as a value of the operating period irrespective of whether the bandwidth limitation is applied.

The value of the second average usage bandwidth is not established till a fixed period elapses after the UDL 51 has been started up for the first time. It may be sufficient that the management unit 7 uses the latest calculation result of the second average usage bandwidth in the middle of the calculation till the value is established. The management unit 7 may use the first average usage bandwidth as a substitute for the second average usage bandwidth and may also use an arbitrary fixed value as this substitute. The management unit 7 may also use the maximum (or minimum) value of the first average usage bandwidths of other UDLs 51n kept operating when executing the processes in FIGS. 7 and 8. Note that a value of the second average usage bandwidth may be taken by a moving average or at a fixed cycle during a period of taking the average.

When the user emphasizes accuracy of the initial value of every value, the initial value may be set by some sort of method, e.g., by accumulating experimental values and other equivalent values. However, when the user permits a transient state, fixation may be employed for the initial value. This is because the transient state is expected to eventually converge to a steady state.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such example in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A bandwidth control circuit comprising:
   bandwidth control digital circuits to be provided respectively for a plurality of circuit blocks cooperating with a processor via a bus; and
   a management circuit configured to control each of the bandwidth control digital circuits,
   each of the bandwidth control digital circuits configured:
   to monitor a bus usage bandwidth of each of the plurality of the circuit blocks;
   to monitor a start and an end of an operating period of each of the plurality of the circuit blocks based on observing an startup signal indicating a process startup of each of the plurality of the circuit blocks and an end signal indicating a process end of each of the plurality of the circuit blocks or observing an operation active status signal of each of the plurality of the circuit blocks; and
   to be enabled to limit the bus usage bandwidth of each of the plurality of the circuit blocks,
   the management circuit configured to limit the bus usage bandwidth, based on a bus average usage bandwidth of each of the plurality of the circuit blocks and the operating period of each of the plurality of the circuit blocks, each of the plurality of the circuit blocks being active in the operating period.

2. The bandwidth control circuit according to claim 1, wherein the management circuit limits the bus usage bandwidths of the plurality of the circuit blocks when a total of in-operation bus average usage bandwidths of the operating periods of in-operation circuit blocks in the plurality of the circuit blocks exceeds a predetermined reference value.

3. The bandwidth control circuit according to claim 1, wherein the management circuit limits the bus usage bandwidth of the circuit block with the in-operation bus average usage bandwidth exceeding a threshold value in the plurality of circuit blocks on the basis of a rate of the operating period, the in-operation bus average usage bandwidth measured during the operating period of each of the plurality of circuit blocks.

4. The bandwidth control circuit according to claim 3, wherein with the management circuit classifies the plurality of the circuit blocks into a first group with the in-operation bus average usage bandwidth being equal to or larger than the threshold value and a second group with the in-operation bus average usage bandwidth being smaller than the threshold value, and determines the threshold value so that a total of the in-operation bus average usage bandwidths of the plurality of the circuit blocks of the first group during operating periods of the circuit blocks and a total of the bus average usage bandwidths of the circuit blocks of the second group during a predetermined monitor period not confined to the operating periods of the circuit blocks, satisfy a predetermined condition.

5. The bandwidth control circuit according to claim 3, wherein the management circuit limits the usage bandwidth of the circuit block with the in-operation bus average usage bandwidth exceeding the threshold value at a Limit Rate calculated by Limit Rate =bus average usage bandwidth during predetermined monitor period/in-operation bus average usage bandwidth with respect to each of the plurality of the circuit blocks, the predetermined monitor period not being confined to the operating period of each of the circuit blocks.

6. An arithmetic processing apparatus comprising:
   a processor;
   a plurality of circuit blocks configured to cooperate with the processor via a bus;
   bandwidth control digital circuits to be provided respectively for a plurality of circuit blocks; and
   a management circuit configured to control each of the bandwidth control digital circuits,
   each of the bandwidth control digital circuits configured:
   to monitor a bus usage bandwidth of each of the plurality of the circuit blocks;
   to monitor a start and an end of an operating period of each of the plurality of the circuit blocks based on observing an startup signal indicating a process startup of each of the plurality of the circuit blocks and an end signal indicating a process end of each of the plurality of the circuit blocks or observing an operation active status signal of each of the plurality of the circuit blocks; and
   to be enabled to limit the bus usage bandwidth of each of the plurality of the circuit blocks,
   the management circuit configured to limit the bus usage bandwidth, based on a bus average usage bandwidth of each of the plurality of the circuit blocks and the operating period of each of the plurality of the circuit blocks, each of the plurality of the circuit blocks being active in the operating period.

7. A bandwidth control method for an apparatus including a processor and a plurality of circuit blocks configured to cooperate with the processor via a bus, the method comprising:
   monitoring a bus usage bandwidth of each of the plurality of the circuit blocks;
   monitoring a start and an end of an operating period of each of the plurality of the circuit blocks based on observing an startup signal indicating a process startup of each of the plurality of the circuit blocks and an end signal indicating a process end of each of the plurality of the circuit blocks or observing an operation active status signal of each of the plurality of the circuit blocks; and limiting the bus usage bandwidth of the plurality of the circuit blocks, based on a bus average usage bandwidth of each of the plurality of the circuit blocks and the operating period of each of the plurality of the circuit blocks, each of the plurality of the circuit blocks being active in the operating period.

\* \* \* \* \*